INVENTOR
HARRY ZOLTOK

BY: *Kent & Dale*

ATTORNEY

United States Patent Office 3,525,115
Patented Aug. 25, 1970

---

3,525,115
WINDSHIELD WIPER ASSEMBLY
Harry Zoltok, Winnipeg, Manitoba, Canada, assignor to Motor Coach Industries Limited, Winnipeg, Manitoba, Canada
Filed Apr. 12, 1968, Ser. No. 720,865
Int. Cl. B60s 1/04
U.S. Cl. 15—250.23      3 Claims

ABSTRACT OF THE DISCLOSURE

An auxiliary wiper blade mounted to the main wiper arm below the main blade of a pantograph wiper assembly in order to clean the area below and unswept by the main wiper blade.

---

This invention relates to new and useful improvements in windshield wipers, particularly windshield wipers of the pantograph type.

Pantograph type windshield wipers are used in order to get a substantially parallel sweep of the blade across the windshield rather than an arc due to the fact that with a relatively large or high windshield, the area covered by a pantograph assembly is larger than the area covered by a conventional blade assuming the same arm length.

However, such pantograph assemblies suffer from a principal disadvantage namely that there is an area of the windshield not wiped, situated below the area swept by the pantograph operated arm.

It is an object of this invention to provide means whereby the major portion of this unwiped area is swept clean by means of an auxiliary blade attached to the main wiper arm.

Another object of the invention is to provide a device of the character herewithin described which is easily secured to existing pantograph type of wiper arms.

A yet further object of the invention is to provide a device of the character herewithin described which is simple in construction, economical in manufacture, and otherwise well suited to the purpose for which it is designed.

With the foregoing considerations in view, and such other objects, purposes or advantages as may become apparent from consideration of this disclosure and specification, the present invention consists of the inventive concept which embraces or includes the method, process, construction, arrangement of parts, or new use of any of the foregoing, as herein particularly exemplified in one or more specific embodiments of such concept, reference being had to the accompanying figures in which:

FIG. 1 is a front elevation of one side of a windshield of a bus, truck or the like.

In the drawings like characters of reference indicate corresponding parts in the different figures.

Figure 1:
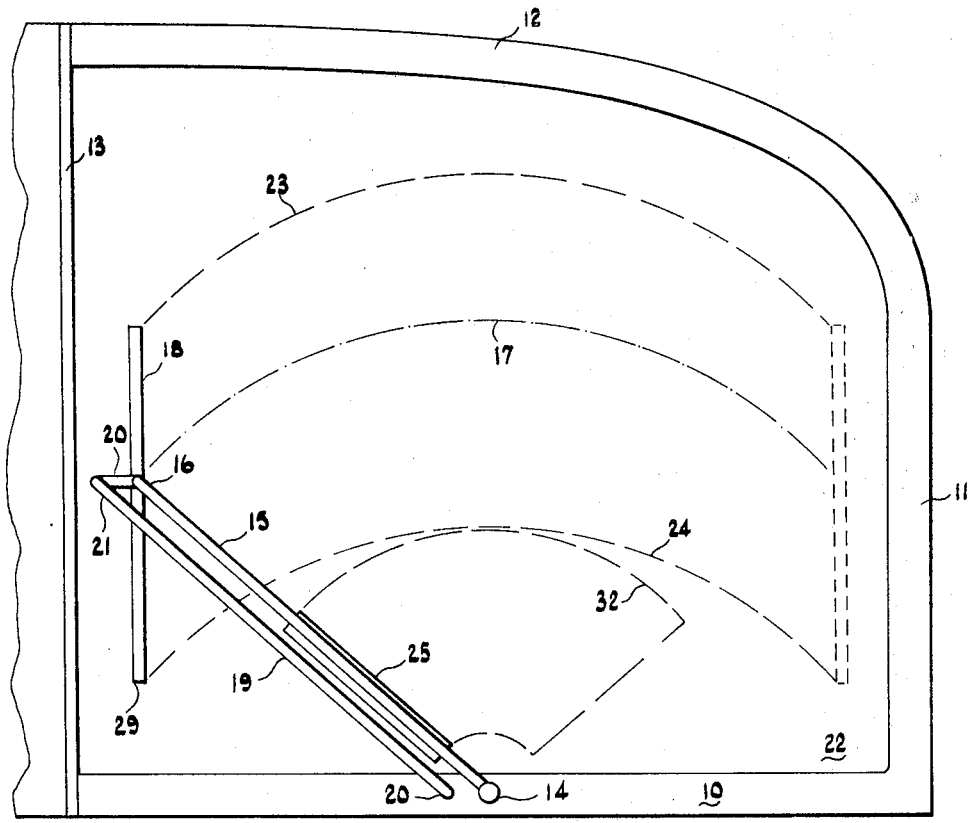
Figure 2:
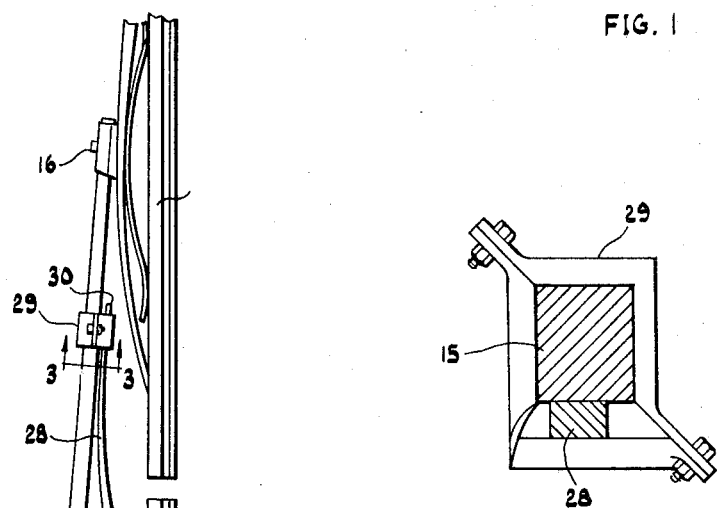
FIG. 2 is a fragmentary side elevation of the main arm showing the attachment of the auxiliary blade thereto.
Figure 3:
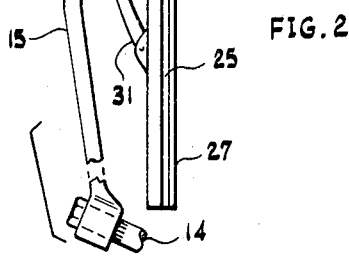
FIG. 3 is an enlarged cross section substantially along the line 3—3 of FIG. 2.

Proceeding therefore to describe the invention in detail, reference character 10 illustrates the base of the windshield frame and 11, the outer side edge which curves upwardly and over towards the upper frame portion 12. A central divider strip 13 is usually provided thus separating the windshield into two portions and it is to be understood that there also is a windshield portion on the other side of the divider strip.

Reference character 14 illustrates the main drive shaft of a windshield wiper assembly operated by a source of power in the usual manner. A main windshield wiper arm 15 is secured by the lower end thereof to this splined shaft 14 so that when the shaft oscillates in the usual manner, the upper end 16 of the main arm 15 describes an arc illustrated by the dotted line 17.

A windshield wiper blade of conventional construction is illustrated at 18 and is pivotally connected adjacent the centre thereof to the other end 16 of the main windshield wiper arm. A pantograph lever 19 is pivotally secured upon a support pin 20 by one end thereof, said support pin being to one side of the main shaft 14.

A link 20′ extends between the other end 21 of the pantograph lever 19 and the wiper blade 18. This pantograph assembly maintains the wiper blade 18 substantially in a vertical position as it sweeps across the windshield glass 22, dotted lines 23 and 24 defining the arcs followed by the upper and lower ends of the windshield wiper arm. It will therefore be appreciated that there is a considerable area that is unswept, situated between the lower defined arc 24 and the base 10 of the windshield frame.

I have secured an auxiliary wiper blade 25 to the main arm 15 intermediate the ends thereof, said auxiliary wiper being of standard construction and including a frame strip 26 and flexible wiper element 27. The attachment of the auxiliary blade 25 to the main arm 15 should be such that it can rock from side to side within limits parallel to the longitudinal axis of the main arm.

An auxiliary blade arm 28 is clamped to the main arm by means of split clamp 29 surrounding the main arm 15 and the end 30 of the arm 28, and it will be observed that the arm 28 extends downwardly towards the drive shaft 14. The auxiliary blade 25 is secured to the other or lower end 31 of the shaft arm 28 in the conventional manner.

It will be observed that this auxiliary blade 25 is secured to the arm 15 so that it is disposed between the pivot shaft 14 and the arc 24 defined by the lower end 29 of the main blade 18 so that this auxiliary blade covers an area enclosed by the dotted line 32 shown in FIG. 1 thus increasing the visibility through the windshield by a considerable amount.

What is claimed to be the present invention is:

1. In combination with a conventional pantograph type windshield wiper assembly which includes a pair of parallelogram arms pivoted to the lower edge portion of a windshield frame and a main wiper blade carried at the upper end of said arms with the lower end of said blade spaced upwardly from the lower edge of the windshield frame so that a windshield area below said main wiper blade is unswept thereby; an auxiliary wiper blade and means mounting the same on an intermediate portion of one of said arms in downwardly spaced relation from said main blade, said auxiliary blade being operative to sweep the windshield area which lies below and is left unswept by the main blade.

2. The combination as defined in claim 1 wherein said mounting means includes an auxiliary arm underlying said one of said arms and connected at one end thereof to said auxiliary blade, and clamp means securing the other end of said auxiliary arm to the intermediate portion of said one of said arms.

3. The combination as defined in claim 2 which is further characterized in that said auxiliary blade and said auxiliary arm are disposed in a common plane with said one of said arms.

References Cited

UNITED STATES PATENTS

| | | | |
|---|---|---|---|
| 2,607,944 | 8/1952 | Turner et al. | 15—250.23 |
| 2,830,314 | 4/1958 | Bitzer | 15—250.23 XR |
| 3,092,865 | 6/1963 | Massoud | 15—250.23 |

FOREIGN PATENTS 793,202  4/1958  Great Britain.

PETER FELDMAN, Primary Examiner

U.S. Cl. X.R.

15—250.35, 250.4